United States Patent [19]

Flanigan

[11] Patent Number: 5,583,168

[45] Date of Patent: *Dec. 10, 1996

[54] ONE-STAGE ABRASIVE ABSORPTION PROCESS FOR PRODUCING TIRE RUBBER MODIFIED ASPHALT CEMENT SYSTEMS AND PRODUCTS THEREOF

[76] Inventor: Theodore P. Flanigan, 313 Baycrest Dr., League City, Tex. 77573

[*] Notice: The portion of the term of this patent subsequent to Mar. 14, 2012, has been disclaimed.

[21] Appl. No.: 366,061

[22] Filed: Dec. 29, 1994

Related U.S. Application Data

[63] Continuation-in-part of Ser. No. 188,329, Jan. 26, 1994, Pat. No. 5,397,818.

[51] Int. Cl.$^6$ ............................ C08L 95/00; C08J 11/06
[52] U.S. Cl. ........................ 524/68; 524/59; 524/69; 524/71; 521/41; 521/44.5
[58] Field of Search ................ 521/41, 44.5; 524/59, 524/62, 68, 69, 71

[56] References Cited

U.S. PATENT DOCUMENTS

| | | | |
|---|---|---|---|
| 3,891,585 | 6/1975 | McDonald | 524/59 |
| 3,919,148 | 11/1975 | Winters et al. | 524/59 |
| 4,069,182 | 1/1978 | McDonald | 524/59 |
| 4,166,049 | 8/1979 | Huff | 521/44.5 |
| 4,358,554 | 11/1982 | Yan et al. | 524/62 |
| 4,430,464 | 2/1984 | Oliver | 524/59 |
| 4,588,634 | 5/1986 | Pagen et al. | 524/68 |
| 4,609,696 | 9/1986 | Wilkes | 524/59 |
| 5,270,361 | 12/1993 | Duong et al. | 524/59 |
| 5,397,818 | 3/1995 | Flanigan | 524/68 |

FOREIGN PATENT DOCUMENTS

| | | | |
|---|---|---|---|
| 0248371 | 8/1987 | Germany | 524/62 |
| 1613455 | 12/1990 | U.S.S.R. | 521/41 |

*Primary Examiner*—Peter A. Szekely

[57] ABSTRACT

A process for preparing a homogenous asphalt composition includes introducing distillation tower bottoms at a temperature of about 425°–470° F. to a vessel through which air is flowing at about 6–15 psi pressure, introducing ground tire rubber to the vessel and bombarding the distillation tower bottoms and ground tire rubber with the air until the mixture is completely and stably homogenized, and recovering the homogenized asphalt composition. The homogenized asphalt composition is a two-component composition of distillation tower bottoms and ground tire rubber abrasively absorbed therein.

13 Claims, 1 Drawing Sheet

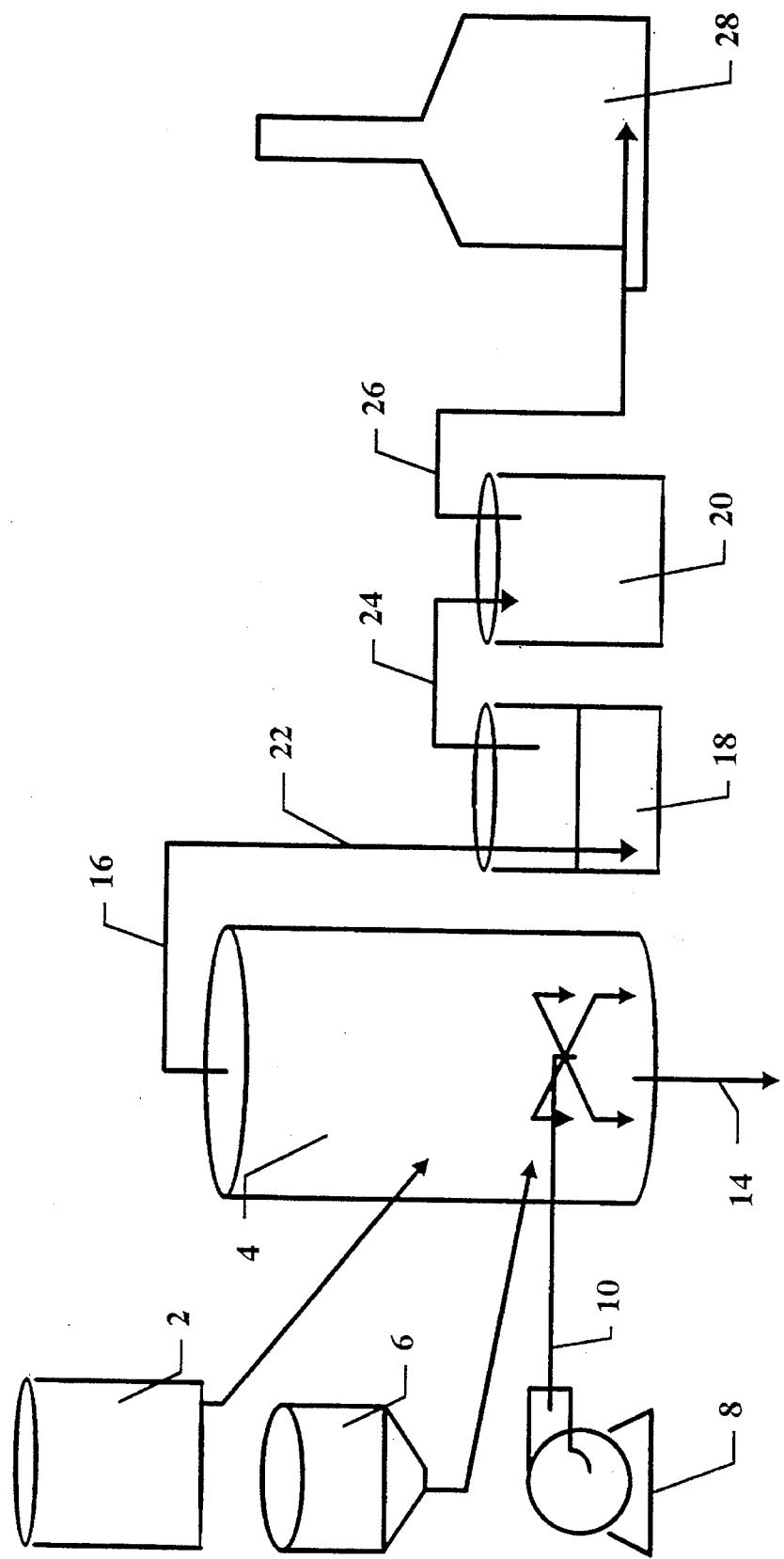

ONE-STAGE ABRASIVE ABSORPTION PROCESS FOR PRODUCING TIRE RUBBER MODIFIED ASPHALT CEMENT SYSTEMS AND PRODUCTS THEREOF

RELATED APPLICATION

This application is a continuation-in-part of Ser. No. 08/188,329, filed Jan. 26, 1994, now U.S. Pat. No. 5,397,818.

FIELD OF THE INVENTION

A process for preparing improved tire rubber modified asphalt cement systems by incorporating ground tire rubber into distillation tower bottoms using bombardment by air in a one-stage abrasive absorption process to make a homogeneous asphalt cement system, and products thereof.

BACKGROUND OF THE INVENTION

Processes for incorporating ground tire rubber into bituminous material to make asphalt cement systems suitable for paving, roofing and other uses have hitherto been unduly complex and thus costly in use. Known processes use additional constituents in the composition and additional process steps in an attempt to provide a homogenous system.

Duong et al., U.S. Pat. No. 5,270,361, is directed to a process for making an asphalt composition which includes synthetic or natural rubber which may be in particles of up to one-half inch in thickness. Elemental selenium or an organo-selenium compound is added into the mixture to act as a substitute for the sulfur which is removed during the vulcanization process. The selenium or organo-selenium compound acts as a cross-linking agent. The composition is treated with pressurized air in a dehydrogenation reaction. In the dehydrogenation vessel, the dispersing device includes a pair of discs turning at 3600 rpm which promotes homogenization and acceleration of the dehydrogenation reaction. Elemental selenium or an organo-selenium compound is added into the homogenized composition and mixed in a static mixer. The asphalt composition is then recovered and stored in a container at about 150° to 175° C.

Wilkes, U.S. Pat. No. 4,609,696, describes a rubberized asphalt composition which is made by combining asphalt with a hydrocarbon oil to provide a homogenized asphalt-oil mixture or solution, combining the mixture with particulate rubber to provide a homogenous gel and emulsifying the gel by passing the asphalt-rubber-oil gel, with water, through a colloid mill.

Oliver, U.S. Pat. No. 4,430,464, describes a pavement binder composition in which rubber particles are digested in a bituminous material. McDonald, U.S. Pat. Nos. 4,069,182 and 3,891,585, describe an elastomeric pavement repair composition and a method for making the composition. Winters et al., U.S. Pat. No. 3,919,148, also describes an elastomeric paving material.

Pagen et al., U.S. Pat. No. 4,588,634 describes a roofing material using bitumen and ground tire rubber together with mineral stabilizer and an elastomeric polymer composition. Air bombardment is not used.

SUMMARY OF THE INVENTION

The invention provides an improved process for preparing homogenized tire rubber modified asphalt cement systems and products thereof which have only two components, distillation tower bottoms (DTB) and ground tire rubber (GTR). No chemicals or special aromatic oils or additives are needed in this process.

According to the process, a single stage of dehydrogenation accomplishes stable combination of the tire rubber and bituminous residue by bombarding with a high volume of air under pressure. The two components are combined into a new composite which is completely homogenized and is stable. The homogenized asphalt composition product does not separate or degrade even over a long period of time. The asphalt composition is useful in the paving and roofing industries.

The process is essentially a one-stage process in which the ground tire rubber and distillation tower bottoms are added into a converter and bombarded with air under increased temperature and pressure so that the ground tire rubber is abrasively absorbed into the distillation tower bottoms in the converter. The wetting process and dehydrogenation process takes place in a single step, using a two-component blend of distillation tower bottoms (DTB) and ground tire rubber (GTR) which are combined in a single stage which takes place in the converter. No special blending is needed prior to or following the process of dehydrogenation. The dehydrogenation is carried out by bombarding with air at about 2200 cfm at about 10 psi at a temperature of about 425°–470° F. The total dehydrogenation time is about 2 to 8 hours.

The dehydrogenation is carried out in a reactor having a stationary air spider located at the bottom of the reactor. The base oil is distillation tower bottoms (DTB) which is the bituminous residue after vacuum distillation, atmospheric distillation, steam stripping of petroleum or other processes known to those skilled in the art. The ground tire rubber (GTR) is recycled rubber obtained from grinding scrap vulcanized rubber tires, tubes, etc. Ground tire rubber is loaded into the DTB in an amount ranging from 1% to 27%, preferably about 10–16%, and most preferably about 12%. The GTR may be sized from a powder grind (about 200 mesh or less) up to about 20mesh. The air volume input through the stationary air distributing spider-shaped device may range from about 1600 to about 2800 cfm and from about 6 psi to about 15 psi, preferably about 2200 cfm at about 10 psi.

BRIEF DESCRIPTION OF THE DRAWING

The Figure illustrates, schematically, apparatus used in a process of the invention.

DETAILED DESCRIPTION OF THE PREFERRED EMBODIMENTS

The invention advantageously provides an asphalt composition which incorporates a bituminous residue, such as distillation tower bottoms (DTB) in a homogenous mixture with ground tire rubber (GTR).

The two-component asphalt composition produced is simple and economical to prepare. According to the process of the invention, compressed air is pumped into an empty converter, distillation tower bottoms are transferred from a storage vessel, where it is maintained at about 350° F., into the converter while the air is being pumped into the converter. After the distillation tower bottoms are in the converter, the ground tire rubber is pumped, pneumatically, into the converter. The air is constantly flowing throughout the entire process. The temperature in the converter is about 425°–470° F., preferably about 450° F., and the distillation tower bottoms and ground tire rubber are bombarded by the compressed air in the converter to allow abrasive absorption of the asphaltic oils of the distillation tower bottoms into the ground tire rubber and complete digestion of the ground tire rubber into the distillation tower bottoms. The finished product is of a single composition and is a stable homogeneous product. The process is conducted in a closed system that is vented through a knockout tank with a liquid seal, followed by a dry tank, and the vapor recovery is concluded by incineration in an incinerator which is maintained at a minimum temperature of 1325° F. The finished product is transferred from the converter and shipped for storage or blended and incorporated into other products. The finished product and any blends thereof may be stored and handled at 350° F.

In the converter, the ground tire rubber is "wetted" with the distillation tower bottoms while being bombarded with a high volume of air which causes intimate mixing of the rubber molecules and bituminous molecules causing dehydrogenation of the rubber and complete and stable homogenization of the resulting composition. Lower hydrocarbon oils are driven off and a completely homogenized asphalt composition which is the product of the process remains in the dehydrogenation vessel. The product is a completely homogenized asphalt composition in which the ground tire rubber is fully incorporated into the distillation tower bottoms. The resulting composition is stable and does not separate out. No additives need to be used. Only distillation tower bottoms and ground tire rubber are used in a preferred embodiment of the process. The asphalt composition has many uses, such as in the roofing or paving industries.

The Figure illustrates the process of the invention, schematically. Distillation tower bottoms (DTB) are stored in vessel 2. A charge of DTB is pumped directly into converter 4 together with a charge of ground tire rubber (GTR) fed from hopper 6. The GTR may be sized from a powder grade (about 200 mesh or less) up to about 20 mesh. In a typical application, the GTR is present in a ratio of 1:99 to 27:33 with respect to DTB, preferably in a ratio of 10:90 to 16:84 and most preferably about 12:88 with respect to DTB. Pressurized air is fed from air compressor 8 at 1600 to 2800 cfm and a pressure of 6 to 15 psi through conduit 10 and stationary spider device 12 which allows the pressurized air to enter the bottom of converter 4, in which dehydrogenation takes place. In a preferred embodiment, the air is pumped into converter 4 through the stationary spider device 12 at 2200 cfm and 10 to 15 psi. As the air bombards the mixture in converter 4, a dehydrogenation process takes place. The dehydrogenation process takes place by injecting air at, for example, 2200 cfm into the bottom of the vessel through the stationary air spider and maintaining the air flow at 10 psi throughout the process. The temperature in the converter is held at about 425°–470° F. during the process. The temperature and airflow are maintained until the targeted softening point is achieved. The material may be sampled every 30 minutes, or as otherwise known to one skilled in the art. The duration of the process may be about 2 to 14 hours for reaching the targeted softening point. Once the targeted softening point is reached, the air and heat are shut off and the finished product, which is completely homogenous is transferred through conduit 14 using a finished product pump (not shown) to the finished product storage. Hydrocarbons released in the dehydrogenation tank are passed to a hydrocarbon collection and vapor recovery area through conduit 16 to knockout tank 18 and dry tank 20. The vapor recovery system takes place through conduits 22, 24, 26. In one example, any remaining uncondensed hydrocarbons are burned in incinerator 28 using a gas fired burner at a temperature of about 1325° F., minimum.

Throughput of the process may be 100 to 500 tons per day using one converter or otherwise as known to one skilled in the art. Other equipment may be used to achieve a similar result. The examples describe preferred embodiments.

A typical sample of DTB may have the following properties:

| Viscosity at 140° F. (poises) | 15–50 ps | ASTM 2171 |
|---|---|---|
| Softening point of flint | 40–70° F. | ASTM D113 |
| Flash point, °F., min. COC | 560° F. | ASTM D92 |

EXAMPLE 1 - PAVING GRADE, 15% CONCENTRATE

A full volume of air, 2200 cfm at 10 psi, was initiated into a reactor. The reactor was then charged with 70.5 tons of DTB, at 350° F. The air volume and pressure was maintained and the air flow continued at 2200 cfm at 10 psi throughout the entire process. After the desired amount (70.5 tons) of DTB was transferred, GTR was pneumatically pumped into the liquid level of the DTB in the reactor. The agitation action of the air into the materials provided an excellent mixture of the GTR and DTB. To charge 12.44 tons of GTR into 70.5 tons DTB takes approximately 80 minutes. The reactor is heated to no more than 470° F. and no less than 425° F. Once the desired temperature is achieved samples are pulled every hour until the desired softening point of 230° F. is achieved. Once the targeted softening point is achieved, the air and heat are shut off and the process is completed. The targeted softening point was achieved after 12 hours and 30 minutes. The finished material is pumped into a vessel for downblending and polymer modification process. Once downblended to a 5% GTR concentrate, using AC-5 and modified with synthetic rubber, the final material is transferred to a holding vessel for shipment. The physical characteristics of the downblended material are shown in Table 1.

TABLE 1

AC-15-5TR
PAVING GRADE ASPHALT CEMENT
Use in Chip Seal Applications

| TESTS | RESULTS | ASTM METHOD |
|---|---|---|
| Viscosity @ 140° F., Poises | 3700 ps | ASTM D2171 |
| Viscosity @ 275° F., Poises | 6.5 ps | Texas Item 300 |
| Penetration @ 77° F. 100 g, 5 sec, dmm | 116 | ASTM D5 |
| Softening Point, °F. | 126° F. | ASTM D36 |
| Flash Point, °F., COC | 555° F. | ASTM D92 |
| Ductility @ 39.2° F. 5 cm/min, cm | 44.0 cm | ASTM D113 |
| Storage Stability 48 hrs @ 325° F. Softening Point difference between Top and Bottom | 0.5% | Texas Item 300 |

EXAMPLE 2 - PAVING GRADE 15% CONCENTRATE

A full volume of air, 2200 cfm at 10 psi, was initiated into a reactor. The reactor was then charged with 75.6 tons of DTB, at 350° F. The air volume and pressure is maintained and continues to flow throughout the entire process. After the desired amount of DTB was transferred, the GTR was pneumatically pumped into the liquid level of the DTB in Reactor 2. The agitation action of the air into the materials provided an excellent mixture of the GTR and DTB. To charge 13.34 tons of GTR takes approximately 90 minutes. The reactor is heated to no more than 470° F. and no less than 425° F. Once the desired temperature is achieved samples are pulled every hour until the desired softening point of 230° F. is achieved. Once the targeted softening point is achieved, the air and heat are shut off and the process is completed. The targeted softening point was achieved after 13 hours and 10 minutes. The finished material is pumped into a vessel in preparation for the downblending and polymer modification process. Once downblended to a 5% GTR concentrate, using AC-20 and modification with synthetic rubber, the downblended material is transferred to a holding vessel for shipment. The physical characteristics of the downblended material are shown in Table 2.

TABLE 2

AC-45-5TR
PAVING GRADE ASPHALT CEMENT
Use in Hot Mix Applications

| TESTS | RESULTS | ASTM METHOD |
| --- | --- | --- |
| Viscosity @ 140° F., Poises | 5664 ps | ASTM D2171 |
| Viscosity @ 275° F., Poises | 11.0 ps | Texas Item 300 |
| Penetration @ 77° F., 100 g, 5 sec, dmm | 70 | ASTM D5 |
| Softening Point, °F. | 127° F. | ASTM D36 |
| Flash Point, °F., COC | 559° F. | ASTM D92 |
| Ductility @ 39.2° F. 5 cm/min, cm | 21.5 cm | ASTM D113 |
| Storage Stability 48 hrs @ 325° F. Softening Point difference between Top and Bottom | 0.75% | Texas Item 300 |

EXAMPLE 3 - ROOFING COATING GRADE @ 5% CONCENTRATE

A full volume of air, 2200 cfm at 10 psi, was initiated into a reactor. The empty reactor was then charged with 28.5 tons of DTB, at 350° F. The air volume and pressure is maintained and continues to flow throughout the entire process. After the desired amount of DTB is transferred, the GTR is pneumatically pumped into the liquid level of the DTB in the reactor. The agitation action of the air into the materials provided an excellent mixture of the GTR and DTB. To charge 1.5 tons of GTR takes aprox. 20 minutes. The reactor is heated to no more than 470° F. and no less than 425° F. Once the desired temperature is achieved samples are pulled every hour until the desired softening point of 200° F. is achieved. Once the targeted softening point is achieved, the air and heat are shut off and the process is completed. The targeted softening point was achieved after 8 hours and 15 minutes. The material is transferred to a holding vessel for shipment. The physical characteristics of the material are shown in Table 3.

TABLE 3

TRMAC COATING
ROOFING GRADE ASPHALT CEMENT
Use in Manufacturing of Roofing Shingles and Roll Goods

| TESTS | RESULTS | ASTM METHOD |
| --- | --- | --- |
| Viscosity @ 400° F., Poises | 2.68 ps | Florida 336-1 |
| Penetration @ 77° F. 100 g, 5 sec, dmm | 20 | ASTM D5 |
| Softening Point, °F. | 200° F. | ASTM D36 |
| Flash Point, °F., COC | 570° F. | ASTM D92 |

TABLE 3-continued

TRMAC COATING
ROOFING GRADE ASPHALT CEMENT
Use in Manufacturing of Roofing Shingles and Roll Goods

| TESTS | RESULTS | ASTM METHOD |
| --- | --- | --- |
| Ductility @ 77° F. 1 cm/min, cm | 6.0 cm | ASTM D113 |

The product of each of the three examples described above is a stable, heat resistant product. The same two-step process was used for each example, with different volumes. The dehydrogenation is achieved without incorporating any chemicals or additional aromatic oils or additives.

The process yields material suitable for use in both roofing and paving industries. The different materials have a different proportion of GTR loading in the DTB and a different time of dehydrogenation processing to achieve the different properties required in the final materials.

About 1–5% of polymer material such as synthetic rubber is capable of being incorporated together with the GTR into the DTB. Examples of synthetic materials are styrene-butadiene-styrene (SBS), styrene-butadiene-rubber (SBR), polyethylene, polyisoprene, polybutylene, polychloroprene (neoprene), nitrile rubber (acrylonitrile butadiene), butyl rubber (copolymer of isobutylene and isoprene) polyacrylonitrile and other materials known to one skilled in the art. Use of excess amounts of synthetic rubbers would cause degradation of the synthetic rubber.

If an insufficient quantity of air is used or if the residence time in the air bombardment vessel is insufficient, the product is unstable and/or not properly homogenous and thus is liable to separate out.

While the invention has been described above with respect to certain embodiments thereof, it will be appreciated by one skilled in the art that variations and modifications may be made without departing from the spirit and scope of the invention.

What is claimed is:

1. A one-stage process for preparing a homogenous asphalt composition consisting essentially of:

introducing distillation tower bottoms at a temperature of about 350°–485° F. into a vessel through which air at a flow rate of about 1600–2800 cfm and about 6–15 psi pressure is being passed, thereby bombarding the distillation tower bottoms with air;

introducing ground tire rubber into the vessel;

bombarding the ground tire rubber and distillation tower bottoms in the vessel with the air under pressure until the ground tire rubber is incorporated by abrasive absorption into the distillation tower bottoms and a homogenized asphalt composition of the ground tire rubber and distillation tower bottoms is obtained; and recovering the homogenized asphalt composition.

2. A process according to claim 1 wherein about 1–27% ground tire rubber is mixed into about 73–99% distillation tower bottoms.

3. A process according to claim 1 wherein about 10–15% ground tire rubber is mixed into about 85–90% distillation tower bottoms.

4. A process according to claim 1 wherein after the ground tire rubber is introduced into the vessel and mixed with the distillation tower bottoms, the temperature of the process is maintained at a temperature of about 425°–475° F.

5. A process according to claim 1 wherein the air bombardment is carried out for about 2–14 hours.

6. A process according to claim 1 wherein the air bombardment is carried out at about 2000–2400 cfm.

7. A process according to claim 1 wherein the air for bombarding the wetted mixture is injected through a stationary spider-shaped injector device.

8. A process according to claim 1 wherein the ground tire rubber includes rubber which is a member selected from the group consisting of natural rubber and synthetic rubber.

9. A process for preparing a homogenous asphalt composition consisting essentially of the steps of:

injecting air at a flow rate of about 1600–2800 cfm and about 6–15 psi pressure for about 2–14 hours through a stationary spider-shaped device in a vessel, simultaneously introducing about 86–90% distillation tower bottoms at a temperature of about 350°–485° F. into the vessel for bombarding with the injected air and introducing about 10–14% ground tire rubber into the vessel, bombarding and abrasively absorbing the distillation tower bottoms and ground tire rubber in the vessel with the injected air until a homogenized asphalt composition is obtained; and recovering the homogenized asphalt composition.

10. A process according to claim 9 wherein after the ground tire rubber is introduced into the vessel and mixed with the distillation tower bottoms, the temperature of the process is maintained at a temperature of about 425°–475° F.

11. A process according to claim 9 wherein the ground tire rubber includes rubber which is a member selected from the group consisting of natural rubber and synthetic rubber.

12. A homogenized asphalt composition made by a process according to claim 1.

13. A homogenized asphalt composition made by a process according to claim 9.

* * * * *